United States Patent [19]

Takayanagi et al.

[11] Patent Number: 4,654,261

[45] Date of Patent: Mar. 31, 1987

[54] SUPPORT OF PHOTOGRAPHIC PAPER

[75] Inventors: Takashi Takayanagi; Yasuzi Asao; Tetsuro Fuchizawa, all of Fujinomiya; Tetusji Jitsumatsu, Nagoya; Kiyoshi Murase, Nagoya; Hiroyuki Kato, Nagoya, all of Japan

[73] Assignee: Fuji Photo Film Co., Ltd.

[21] Appl. No.: 853,126

[22] Filed: Apr. 14, 1986

[30] Foreign Application Priority Data

Apr. 12, 1985 [JP] Japan .................................. 60-78150

[51] Int. Cl.[4] .............................................. B32B 27/10

[52] U.S. Cl. .................................. 428/336; 428/514; 428/520; 428/522; 427/35

[58] Field of Search ............... 428/336, 514, 522, 520; 427/35

*Primary Examiner*—Alexander S. Thomas

*Attorney, Agent, or Firm*—Toren, McGeady and Goldberg

[57] ABSTRACT

A water-proof support of photographic paper comprising a substrate and a white pigment-containing resin layer provided on at least one surface of the substrate, in which the resin layer comprises a white pigment dispersed in a polymer binder made by polymerization of a unsaturated compound containing a tetraacrylate ester of pentaerythrithol alkylene oxide adduct. An adhesive layer may be provided between the substrate and the white pigment-containing resin layer.

28 Claims, No Drawings

SUPPORT OF PHOTOGRAPHIC PAPER

BACKGROUND OF THE INVENTION

1. Field of the Invention

This invention relates to a water-proof support of photographic paper and a process for the preparation of the same.

2. Description of Prior Arts

A photographic paper consists essentially of a support, a silver halide emulsion layer (i.e, photographic emulsion layer), and a protective gelatin layer. In the case that a paper sheet made of pulp is employed as the support, the paper sheet ought to be so processed as to keep itself from permeation of a developing solution. In the prior art, the paper sheet is generally water-proofed on its both sides by forming a water-proof polymer layer of a polyolefin resin such as polyethylene. The formation of the polyolefin resin layer is generally done by coating a melted polyolefin resin through melt extrusion on both surfaces of the paper sheet and chilling the coated resin by means of a cooling roll. The front polyolefin resin layer to receive thereon a photographic emulsion generally contains a white pigment such as titanium dioxide to improve hiding powder of the layer.

As is stated above, the ordinary support on photographic paper is composed essentially of a paper sheet, a white pigment-containing polyolefin resin layer provided on one side of the sheet to receive a photographic emulsion layer, and a polyolefin resin layer possibly containing a white pigment therein provided on another side of the sheet. The polyolefin resin layer of a support of this type is preferably as thin as possible from the viewpoint of production efficiency and production cost. However, if the white pigment-containing resin layer is made thinner, the hiding power of the resin layer lowers. Therefore, the thin polyolefin resin layer has to contain a white pigment therein at an increased density.

However, since a melted polyolefin resin is so viscous as to poorly disperse the white pigment therein, the increase of the density (or concentration) of a white pigment in the polyolefin resin layer is under certain limitation. At present, a white pigment-containing polyolefin resin layer of the support contains a white pigment almost at the maximum level. Accordingly, it is difficult to make thinner the white pigment-containing polyolefin resin layer without decreasing the total amount of white pigment in the resin layer. The decrease of the total amount of the white pigment results in decrease of hiding powder thereof. A photographic paper using a support having such poor hiding power hardly gives a photographic print of high resolution.

Further, a melted polyolefin resin sometimes turns yellow in the coating procedure according to melt extrusion or brings pin holes into the resulting resin layer. whereby reducing the quality of the obtained support.

In view of the above problems, Japanese Patent Provisional Publications No. 57(1982)-27257 and No. 57(1982)-49946 have proposed processes of preparing a water-proof resin layer which comprises coating a polymerizable organic compound on a support and curing thus coated layer by irradiation with electron beam. These processes use a coating dispersion of a white pigment dispersed with high concentration in a solution of low viscosity which is made by dissolving an organic compound having a unsaturated bonding in the molecular structure in a solvent. The coating solution is coated on a paper sheet and the resulting coated layer is then cured by irradiation with electron beam to form a polymer layer. This process is advantageous in that a thin water-proof resin layer can be formed without reduction of hiding powder, because a white pigment can be uniformly introduced into a coating solution with high concentration. Further, since the resin layer is formed by irradiation with electron beam at an ambient temperature, the formed resin layer is almost free from yellowing caused by thermal decomposition and further almost free from formation of pin holes.

It has been noted by the present inventors that the support of photographic paper prepared according to the above-mentioned known processes is liable to adsorb a developing agent thereon in the developing stage and to be colored to yellow by action of the adsorbed developing agent. Further noted is that cracks are easily produced in the white pigment-containing resin layer of the support, when the support is bent.

SUMMARY OF THE INVENTION

An object of the present invention is to provide a water-proof support of photographic paper which can be so prepared as to have a thin white pigment-containing resin layer without decrease of hiding powder, and a process for the preparation of the support.

Another object of the invention is to provide a water-proof support of photographic paper which can be so prepared as to have a thin white pigment-containing resin layer without decrease of hiding powder and which is resistant to production of cracks and coloring by the developing agent.

The present invention resides in a water-proof support of photographic paper comprising a substrate and a white pigment-containing resin layer provided on at least one surface of the substrate, in which the resin layer comprises a white pigment dispersed in a polymer binder made by polymerization of a unsaturated compound containing a tetraacrylate ester of pentaerythritol alkylene oxide adduct.

The present invention further resides in a water-proof support of photographic paper comprising:

a substrate, a white pigment-containing resin layer provided on at least one surface of the substrate, in which the resin layer comprises a white pigment dispersed in a polymer binder made by polymerization of a unsaturated compound containing a tetraacrylate ester of pentaerythrithol alkylene oxide adduct, and an adhesive layer provided between the substrate and white pigment-containing resin layer.

The white pigment-containing resin layer of the support of the invention is advantageously prepared by a process which comprises coating a coating dispersion containing a white pigment and a unsaturated compound containing a tetraacrylae ester of pentaerythrithol alkylene oxide adduct on the substrate or a temporary substrate and irradiating the coated layer with electron beam to cure the coated compound.

Examples of the substrate of the support of the invention include a paper sheet, a resin-coated paper sheet having a water-proofing resin layer on both surfaces, and a resin sheet. In the case of using a paper sheet as the substrate, a surface of the paper sheet not to be coated with the white pigment-containing resin layer may be coated with the conventional resin layer.

DETAILED DESCRIPTION OF THE INVENTION

According to the present invention, there can be provided a water-proof support of photographic paper which can be easily prepared to have a thin white pigment-containing resin layer without decrease of its hiding power. Further, the support of the invention is improved in resistance to bending action, as compared with a support of the same type. Accordingly, cracks are difficultly produced on the support of the invention. Furthermore, the support of the invention hardly adsorbes a developing agent in the developing stage and accordingly is almost free from coloring by the developing agent.

As described hereinbefore, the support of photographic paper of the invention is advantageously prepared by a process which comprises coating a coating dispersion containing a white pigment and a unsaturated compound containing a tetraacrylate ester of pentaerythrithol alkylene oxide adduct on a paper sheet and irradiating the coated layer with electron beam to cure the coated compound.

The pentaerythrithol alkylene oxide adduct preferably contains alkylene oxide units in an amount of 5 moles or more per 1 mole of the adduct. The pentaerythrithol alkylene oxide adduct is generally produced in the form of a mixture containing various adducts having different amounts of alkylene oxide units. Accordingly, the "amount of alkylene oxide (units)" used in the invention means an average amount of alkylene oxide (units) per adduct determined on the mixture.

In the invention, the tetraacrylate ester of pentaerythritol alkylene oxide adduct preferably has the following formula:

$$\begin{array}{c} CH_2O(X)_lCOCH{=}CH_2 \\ | \\ CH_2{=}CHCO(X)_kO{-}CH_2{-}C{-}CH_2O(X)_mCOCH{=}CH_2 \\ | \\ CH_2O(X)_nCOCH{=}CH_2 \end{array}$$

in which X is an oxyalkylene group, and k+l+m+n is a value of 5 or more, preferably 5–15, more prefeably 6–15.

The tetraacrylate ester of pentaerythrithol alkylene oxide adduct of the above formula is generally produced as a mixture of various esters containing different moles of alkylene oxides units. In that case, the value of k+l+m+n is an average value.

In the above-descrbied formula, X preferably is an oxyethylene group, oxypropylene group, oxybutylene group or oxystyrene group. The value of k+l+m+n preferably is 5 or more (not more than 15) and more preferably is a value in the range of 6 to 10.

The most preferred tetraacrylate ester of pentaerythrithol alkylene oxide adduct is an ester of the above formula in which X is an oxypropylene group and k+l+m+n is approx. 8.

The tetraacrylate ester of pentaerythrithol alkylene oxide adduct of the invention can be employed in combination with other unsaturated compound which is preferably polymerizable by irradiation with electron beam.

Examples of the polymerizable compound employable in combination with the tetraacrylate ester include unsaturated organic compounds having one C=C double bond in one molecule such as acrylic acid ester, methacrylic acid ester and ether acrylate; unsaturated organic compounds having two C=C double bonds in one molecule such as diacrylate and dimethacrylate of ester, ether, epoxy or urethane type; unsaturated organic compounds having three C=C double bonds in one molecule such as triacrylate and trimethacrylate of ester, ether, epoxy or urethane type; and unsaturated organic compounds having one C=C double bond and one epoxy group in one molecule such as epoxyacrylate and epoxymethacrylate. In the case of using the tetraacrylate of pentaerythritol alkylene oxide adduct in combination with other polymerizable compound, the tetraacrylate preferably amounts to 50 wt.% or more of the total amount of the polymerizable compound employed.

In the process of the preparation of the support of the invention, the polymerizable compound is coated on a substrate and then polymerized by irradiation of electron beam to form a resin component of the white pigment-containing resin layer. The formed resin serves for providing the support with water-proofness and serves as binder of the white pigment. The binder component of the white pigment-containing resin layer can be composed of a resin produced by the polymerization of the aforementioned polymerizable compound only or a mixture of the in-situ polymerized resin and one or more of other polymers such as cellulose ester, polyvinyl butyral, polyvinyl acetate, vinyl acetate copolymer, polyester resin, styrene-acrylate resin and polystyrene resin. In the case of using the polymerizable compound of the invention in combination with other polymer, the polymerizable compound preferably amounts to 50 wt.% or more of the mixture for the preparation of the resin component.

The white pigment can be chosen from known or proposed pigments for the use in the conventional support of photographic paper for hiding purpose. Examples of the white pigment include titanium dioxide, barium sulfate, calcium sulfate, barium carbonate, calcium carbonate, lithopone, alumina white, zinc oxid, silica, antimony trioxide, titanium triphosphate. The white pigment can be used singly or in combination.

As the white pigment, titanium dioixde is preferred because it shows high hiding power. Titanium dioxide employable in the present invention can be prepared by a sulfuric acid process or a chlorine process and can be in any type such as rutile-type or anatase-type. Titanium dioxide of rutile type and titanium dioxide of anatase-type can be employed in combination. Titanium dioxide can be pre-coated with an inorganic material such as hydrated aluminum oxide or hydrated silicon dioxide. Titanium dioxide can be pre-coated with an alcohol such as trimethylolmethane, trimethylolethane, trimethylolpropane or 2,4-dihydroxy-2-methylpentane, or a siloxane.

The white pigment preferably has a mean size of more than 0.1 μm, preferably 0.15 μm or more. A white pigment having a mean size of not more than 0.1 μm sometimes is not sufficiently effective to give the desired resolution to the photographic paper.

In the formation of the white pigment-containing resin layer according to the invention, a coating composition in the form of dispersion is prepared to contain the binder component, that is, the unsaturated compound and optional resin, and a white pigment, and the resulting coating composition is coated on a substrate. The ratio between the binder component and the white pigment preferably ranges from 3/1 to 1/9, more preferably ranges from 2/1 to ¼, by weight. The coating composition can contain other pigment such as blue pigment, purple pigment or red pigment or other known additive such as antistatic agent according to prior arts relating to a photographic paper.

The materials constituting the polymerizable coating composition for the preparation of a white pigment-containing resin layer can be introduced simultaneously or in any optional order into a mixing means such as kneader or the like for the preparation of a coating composition.

Any mixing means can be employed for mixing and dispersing the constitutional materials of the coating composition. For instance, there can be mentioned twin-roll mill, triple roll mill, ball mill, pebble mill, thron mill, sand grinder, Szegvari attritor, high-speed impeller dispersing device, high-speed stone mill, high-speed impact pulverizer, keader, high-speed mixer, homogenizer, and ultrasonic dispersing device.

The coating dispersion can contain an organic solvent. Examples of the solvent include ketones such as acetone, methyl ethyl ketone and cyclohexanone; esters such as methyl acetate, ethyl acetate, butyl acetate, ethyl lactate and monoethyl ether of glycol acetate; ethers; glycol ethers such as glycol dimethylether, glycol monomethylether and dioxane; aromatic hydrocarbons such as benzene, toluene and xylene; and chlorinated hydrocarbons such as methylene chloride, ethylene chloride, carbon tetrachloride, chloroform, ethylenechlorohydrin and dichlorobenzene.

Examples of the substrate of the support of the invention include a paper sheet, a resin-coated paper sheet having a water-proofing resin layer on both surfaces, and a resin sheet.

The paper sheet employable in the invention is an optionally chosen paper sheet. A variety of paper sheets such as paper sheets composed of natural pulp, synthetic pulp of plastic material such as polyethylene or polypropylene, a mixture of natural pulp and synthetic pulp can be employed. The paper sheet can be composed of two or more layers, for instance, a combination of a natural pulp layer and a synthetic pulp layer. The paper sheet can be acidly sized with a fatty acid soap, a fatty acid anhydride or the like, or neutrally sized with an alkylketene dimer. The paper sheet can contain a dry paper strength-increasing agent, a wet paper strength-increasing agent, a fluorescent whitening agent, a dye, a pigment, etc, which can be sized internally or through a surface sizing procedure. The paper sheet is advantageously sized with a water-soluble or water-dispersable binder through a surface sizing procedure. Such surface sizing agent may contain a water-repellant, an antistatic agent, a fluorescent whitening agent, a dye, a pigment, etc.

There is no specific limitation on the weight of the paper sheet, but generally the weight ranges from 60 to 250 $g/m^2$, preferably 80 to 200 $g/m^2$.

As is described above, the paper sheet can be used as the substrate of the invention in the form of a resin-coated paper. The resin-coated paper is prepared by forming a resin layer such as layer of polyolefin (e.g., polyethylene or polypropylene) on the paper sheet. The resin layer preferably has a thickness in the range of 5 to 50 μm.

Accordingly, the white pigment-containing resin layer of the invention can be provided directly on a paper sheet or provided on a resin layer formed on a paper sheet. In the case of using a simple paper sheet as the substrate, a surface of the paper sheet not to be coated with the white pigment-containing resin layer can be coated with the conventional resin layer.

The substrate can be made of a resin sheet such as a polyethylene sheet or a polypropylene sheet.

The coating dispersion for the preparation of the white pigment-containing resin layer can be coated on the substrate by air doctor coating, blade coating, air knife coating, squeeze coating, reverse roll coating, transfer roll coating, gravure coating, kiss roll coating, cast coating, spray coating, spin coating and other known coating procedures.

The coating dispersion is coated on the paper sheet preferably in an amount of solid component of 1-100 $g/m^2$, and more preferably 3-50 $g/m^2$. It is most preferred that the amount ranges from 5 to 20 $g/m^2$, from the viewpoints of the coating workability and the resulting resolution of the photographic paper.

The coated layer generally has a thickness of dry basis in the range of 3 to 100 μm, preferably 5 to 50 μm.

The coating dispersion can be provided on a surface-treated substrate. The surface treatment of substrate can be done by corona discharge or the like for enhancement of affinity or adhesion to the coating dispersion.

The coating dispersion coated on the substrate is cured by irradiation with electron beam. The irradiation with electron bean can be performed by means of a known apparatus, for instance, an apparatus employing a van de Graaff-type scanning system, a double scanning system, and a curtain beam system. The curtain beam system is preferred because it is economical and gives a high power. The electron radiation is generally produced at an acceleration voltage of 100–1,000 kV, preferably 100–300 kV. The dosage of electron beam radiation absorbed by the coated layer generally ranges from 0.5 to 20 megarads, and preferably ranges from 2 to 10 megarads. If the acceleration voltage is lower the 100 kV, the energy is too low to penetrate the coated layer. If the acceleration voltage is so high as to exceed 1,000 kV, efficiency of radiation energy actually utilizable for the polymerization lowers. A radiation dosage less than 0.5 megarad does not cause satisfactory curing reaction, and thus no satisfactory product is obtained. On the other hand, a radiation dosage exceeding 20 megarads is not efficiently absorbed by the coated layer, and sometimes causes exorthermic reaction in the coated layer.

The electron beam radiation is preferably performed in an atmosphere containing oxygen in an amount of at most 5,000 ppm. An atmosphere containing oxygen of more than 5,000 ppm may disturb the polymerization reaction.

The unsaturated organic compound-coated layer can be processed on the surface prior to beginning of the polymerization or after completion of the polymerization. Examples of such processing include a surface-smoothing processing using a mirror-surface roll and a surface-matte finish using a matte roll such as a silk finish roll. The cured layer, that is, polymer layer, can be further processed on the surface by a surface-processing such as corona discharge so as to increase its adhesive affinity to a photographic emulsion layer. Such adhesive affinity can be given by providing a subbing layer on the polymer layer.

The support of the present invention can be prepared by combining a substrate and a separately-prepared at least one white pigment-containing resin film via an adhesive. According to this process, the irradiation with electron beam is not applied to the substrate of the support, whereby obviating a possible yellowing of the substrate which is caused by the irradiation of high energy electron beam.

In more detail, this support is preferably prepared by a process for the preparation of a water-proof support of photographic paper which comprises:

combining a substrate and at least one white pigment-containing water-proofing resin film which has been formed by coating a coating dispersion containing a white pigment and a unsaturated compound containing a tetraacrylate ester of pentaerythrithol alkylene oxide adduct on a temporary substrate other than the above substrate, irradiating the coated layer with electron beam to cure the coated compound, via an adhesive, and separating the combined substrate and resin film from the temporary substrate.

The preparation of the white pigment-containing water-proofing resin film can be done in the same manner as described above, except that the substrate to be used is other than the substrate of the support. Such other substrate, namely temporary substrate, may be a metal sheet, a drum having a metal-surface, a metal belt, a plastic sheet such as a polyester sheet, a plastic-coated paper, and a glass plate.

The cured resin film can be subjected to known treatemnt such as smoothing for forming glossy surface, embossing, etc.

There is no limitation with respect to the adhesive, so long as it can combine the cured resin film and the substrate together. Examples of the adhesive include urea resin, melamine resin, phenol resin, vinyl acetate resin, and a hot melt resin. The hot melt resin is preferred. Examples of the hot melt resin include polyolefin, ethylene-vinyl acetate copolymer, ethyleneacrylate copolymer, ethylene-isobutylacrylate copolymer, polyamide, butyral resin, vinyl acetate-crotonic acid copolymer, vinyl acetate-phthalic anhydride resin, cellulose derivative, plyester, polymethyl methacrylate, polyvinyl eter and polyurethane. Particularly preferred is polyethylene.

The adhesive is prepferably used in the form of a film prepared by melt extrusion at a temperature of 300°±20° C. Otherwise, an adhesive can be arranged on the substrate or the cured film in advance of performing the combining procedure.

The adhesive film preferably has a thickness in the range of 5 to 50 μm, more preferably 10 to 30 μm.

The support of the present invention can be employed as a phtographic paper after being coated on the white pigment-containing resin layer with a phtographic emulsion layer (i.e., silver-halide photosensitive emulsion layer) according to the conventional process.

The following examples further describes the present invention. The "part(s)" mentioned in the examples means "part(s) by weight", unless otherwise stated.

EXAMPLE 1

The following composition was mixed in a ball mill for 20 hours, and then coated on a front surface of a paper sheet of 180 μm thick having on the front surface a water-proof resin layer of 20 μm thick made of polyethylene (density: 0.926 g/cm$^3$, melt index: 2.0 g/10 min.) and on the reverse surface a water-proof resin layer of 20 μm thick made of polyethylene (density: 0.960 g/cm$^3$, melt index: 25 g/10 min.).

| Composition of Coating Dispersion | |
|---|---|
| Titanium dioxide (rutile type) | 50 parts |
| Tetraacrylate ester of pentaerythrithol propylene oxide (8 moles) adduct | 50 parts |

Subsequently, the coated layer was irradiated under nitrogen atmosphere (oxygen concentration: 300 ppm) with electron beam at an acceleration voltage of 200 kV to absorb an absorption dosage of 5 megarad. Thus, the coated layer was cured to obtain a support of photographic paper according to the invention.

EXAMPLE 2

The procedure of Example 1 was repeated except that the tetraacrylate ester of pentaerythrithol propylene oxide (8 moles) adduct was replaced with tetraacrylate ester of pentaerythrithol ethylene oxide (4 moles) adduct, to obtain a support of photographic paper according to the invention.

EXAMPLE 3

The procedure of Example 1 was repeated except that the tetraacrylate ester of pentaerythrithol propylene oxide (8 moles) adduct was replaced with tetraacrylate ester of pentaerythrithol propylene oxide (4 moles) adduct, to obtain a support of photographic paper according to the invention.

EXAMPLE 4

The procedure of Example 1 was repeated except that the tetraacrylate ester of pentaerythrithol propylene oxide (8 moles) adduct was replaced with tetraacrylate ester of pentaerythrithol propylene oxide (16 moles) adduct, to obtain a support of photographic paper according to the invention.

COMPARISON EXAMPLE 1

The procedure of Example 1 was repeated except that the tetraacrylate ester of pentaerythrithol propylene oxide (8 moles) adduct was replaced with tetraacrylate ester of pentaerythrithol propylene oxide (3 moles) adduct, to obtain a support of photographic paper.

COMPARISON EXAMPLE 2

The procedure of Example 1 was repeated except that the tetraacrylate ester of pentaerythrithol propylene oxide (8 moles) adduct was replaced with tetraacrylate ester of pentaerythrithol containing no alkylene oxide, to obtain a support of photographic paper.

EVALUATION OF SUPPORT

The supports of photographic paper obtained in the Examples 1-4 and Comparison Examples 1 and 2 were evaluated on resistance to bending action, and resistance to coloring of the cured layer after being subjected to a developing treatment, in the following manner.

1. Resistance to Bending Action

The support sample was wound around a number of bars having different diameters in such a manner that the cured layer faced outside. The surface of the cured layer was observed with respect to cracks. The evaluation was made to determine the smallest diameter of bar at which cracks were observed on the cured layer.

Therefore, a smaller value means that the layer is more resistant to production of cracks.

In view of practical use of a support for photographic paper, this value should be not more than approx. 1 cm.

2. Coloring of Cured Layer after Color Development

The support sample was developed in a color developing solution. The whiteness of the cured layer was determined before and after the development by means of a color analyzer (Type 607, Hitachi Ltd.) by measuring a reflection ratio at 440 mμ. The whiteness of the cured layer before development wad deduced from the whiteness of the layer after development to determine lowering of the whiteness. Accordingly, a smaller value means less coloring.

In view of practical use of a support for photographic paper, this value should be less than approx. 5%.

The results are set forth in Table 1.

TABLE 1

| Example | Resistance to Coloring | Resistance to Bending |
|---|---|---|
| Example 1 | 0.2% | 0.2 cm |
| Example 2 | 0.5% | 0.2 cm |
| Example 3 | 0.2% | 1.0 cm |
| Example 4 | 4.0% | 0.2 cm |
| Com. Ex. 1 | 10.5% | 0.2 cm |
| Com. Ex. 2 | 0.1% | 2.0 cm |

As is clear from the results set forth in Table 1, the supports of Examples 1–4 according to the present invention show not only high resistance to bending, that is, resistance to having cracks, but also high resistance to coloring. In contrast, the supports of Comparison Examples 1 and 2 are poor in at least one resistance.

PREPARATION OF PHOTOGRAPHIC PAPER

Each of the supports prepared in Examples 1–4 was treated by corona discharge on the surface having the white pigment-containing resin layer. On the treated surface was provided a silver halide-gelatin photographic emusion layer and a protective gelatin layer in this order to prepare a color photographic paper.

The photographic papers showed satisfactory photographic characteristics such as sensitivity and anti-fog. Further, these showed satisfactory resolution and gloss.

EXAMPLE 5

The following composition was mixed in a ball mill for 20 hours, and then coated on a highly glossy chromium plated steel-made surface of a drum in an amount of 20 $g/m^2$ by a transfer roll.

| Composition of Coating Dispersion | |
|---|---|
| Titanium dioxide (rutile type) | 50 parts |
| Tetraacrylate ester of pentaerythrithol propylene oxide (8 moles) adduct | 50 parts |

Subsequently, the coated layer was irradiated under nitrogen atmosphere (oxygen concentration: 300 ppm) with electron beam at an acceleration voltage of 200 kV to absorb an absorption dosage of 5 megarad. Thus, the coated layer was cured. To the cured layer was laminated a paper sheet (weight: 170 $g/m^2$) using a melt polyethylene film of 20 μm thick which was made from 90 parts of a low density polyethylene (density: 0.92 $g/cm^3$, melt index: 3 g/10 min.) and 10 parts of titanium dioxide (rutile type). Thus prepared composite was separated from the drum. The reverse surface of the paper sheet was provided with a resin layer of a polyethylene composition consisting of 70 parts of a high density polyethylene (density: 0.96 $g/cm^3$, melt index: 10 g/10 min.) and 30 parts of a low density polyethylene (density: 0.92 $g/cm^3$, melt index: 3 g/10 min.).

The resulting support was evaluated in the same manner as in Example 1 and confirmed that this support had the properties of almost the same level as those of the support prepared in Example 1. Further, no yellowing was observed on the paper sheet.

We claim:

1. A water-proof support of photographic paper comprising a substrate and a white pigment-containing resin layer provided on at least one surface of the substrate, in which the resin layer comprises a white pigment dispersed in a polymer binder made by polymerization of a unsaturated compound containing a tetraacrylate ester of pentaerythrithol alkylene oxide adduct.

2. The support as claimed in claim 1, wherein the pentaerythrithol alkylene oxide adduct is composed of pentaerythrithol and alkylene oxide in an amount of 5 moles or more per 1 mole of the pentaerythrithol.

3. The support as claimed in claim 1, wherein the petnaerythrithol alkylene oxide has the following formula:

$$CH_2{=}CHCO(X)_kO{-}CH_2{-}\overset{\displaystyle CH_2O(X)_lCOCH{=}CH_2}{\underset{\displaystyle CH_2O(X)_nCOCH{=}CH_2}{C}}{-}CH_2O(X)_mCOCH{=}CH_2$$

in which X is an oxyalkylene group, and $k+l+m+n$ is a value of 5 or more.

4. The support as claimed in claim 3, wherein the X in the formula is at least one group selected from the group consisting of oxyethylene, oxypropylene, oxybutylene and oxybutylene.

5. The support as claimed in any one of claims 1 to 3, wherein the polymer binder is made by polymerization of a unsaturated compound containing 50 wt.% or more of a tetraacrylate ester of pentaerythrithol alkylene oxide adduct.

6. The support as claimed in any one of claims 1 to 3, wherein the polymer binder is made by polymerization of a unsaturated compound consisting essentially of a tetraacrylate ester of pentaerythrithol alkylene oxide adduct.

7. The support as claimed in any one of claims 1 to 3, wherein the white pigment is present in the polymer binder of the resin layer in a ratio by weight ranging from 3/1 to 1/9.

8. The support as claimed in any one of claims 1 to 3, wherein the white pigment-containing resin layer has a thickness in the range from 3 to 100 μm.

9. The support as claimed in any one of claims 1 to 3, wherein the substrate is composed of a paper sheet coated on both surfaces thereof a water-proofing resin.

10. In a process for the preparation of a water-proof support of photographic paper which comprises forming at least one white pigment-containing water-proofing resin layer on a substrate, the improvement in which the white pigment-containing water-proofing is formed by coating a coating dispersion containing a white pigment and a unsaturated compound containing a tetraacrylate ester of pentaerythrithol alkylene oxide adduct on the substrate and irradiating the coated layer with electron beam to cure the coated compound.

11. The process for the preparation of a support as claimed in claim 10, wherein the pentaerythrithol alkylene oxide adduct is composed of pentaerythrithol and alkylene oxide in an amount of 5 moles or more per 1 mole of the pentaerythrithol.

12. The process for the preparation of a support as claimed in claim 10, wherein the unsaturated compound consists essentially of a tetraacrylate ester of pentaerythrithol alkylene oxide adduct.

13. The process for the preparation of a support as claimed in claim 10, wherein the irradiation with electron beam is performed at an acceleration voltage in the range of 100–1,000 kV to have the coated layer to absorb radiation in the range of 2 to 10 megarads.

14. A water-proof support of photographic paper comprising:

a substrate, a white pigment-containing resin layer provided on at least one surface of the substrate, in which the resin layer comprises a white pigment dispersed in a polymer binder made by polymerization of a unsaturated compound containing a tetraacrylate ester of pentaerythrithol alkylene oxide adduct, and an adhesive layer provided between the substrate and white pigment-containing resin layer.

15. The support as claimed in claim 14, wherein the pentaerythrithol alkylene oxide adduct is composed of pentaerythrithol and alkylene oxide in an amount of 5 moles or more per 1 mole of the pentaerythrithol.

16. The support as claimed in claim 14, wherein the petnaerythrithol alkylene oxide has the following formula:

$$\begin{array}{c} \qquad\qquad\qquad\qquad\qquad CH_2O(X)_lCOCH{=}CH_2 \\ \qquad\qquad\qquad\qquad | \\ CH_2{=}CHCO(X)_kO{-}CH_2{-}C{-}CH_2O(X)_mCOCH{=}CH_2 \\ \qquad\qquad\qquad\qquad | \\ \qquad\qquad\qquad\qquad\qquad CH_2O(X)_nCOCH{=}CH_2 \end{array}$$

in which X is an oxyalkylene group, and k+1+m+n is a value of 5 or more.

17. The support as claimed in claim 16, wherein the X in the formula is at least one group selected from the group consisting of oxyethylene, oxypropylene, oxybutylene and oxybutylene.

18. The support as claimed in any one of claims 14 to 16, wherein the polymer binder is made by polymerization of a unsaturated compound containing 50 wt.% or more of a tetraacrylate ester of pentaerythrithol alkylene oxide adduct.

19. The support as claimed in any one of claims 14 to 16, wherein the polymer binder is made by polymerization of a unsaturated compound consisting essentially of a tetraacrylate ester of pentaerythrithol alkylene oxide adduct.

20. The support as claimed in any one of claims 14 to 16, wherein the white pigment is present in the polymer binder of the resin layer in a ratio by weight ranging from 3/1 to 1/9.

21. The support as claimed in any one of claims 14 to 16, wherein the white pigment-containing resin layer has a thickness in the range from 3 to 100 μm.

22. The support as claimed in any one of claims 14 to 16, wherein the substrate is composed of a paper sheet coated on both surfaces thereof a water-proofing resin.

23. The support as claimed in any one of claims 14 to 16, wherein the adhesive layer has a thickness in the range of 5 to 50 μm.

24. The support as claimed in any one of claims 14 to 16, wherein the adhesive layer is made of at least one material selected from the group consisting of urea resin, melamine resin, phenol resin, vinyl acetate resin, and a hot melt resin.

25. A process for the preparation of a water-proof support of photographic paper which comprises:

combining a substrate and at least one white pigment-containing water-proofing resin film which has been formed by coating a coating dispersion containing a white pigment and a unsaturated compound containing a tetraacrylate ester of pentaerythrithol alkylene oxide adduct on a temporary substrate other than the above substrate, irradiating the coated layer with electron beam to cure the coated compound, via an adhesive, and separating the combined substrate and cured film from the temporary substrate.

26. The process for the preparation of a support as claimed in claim 25, wherein the pentaerythrithol alkylene oxide adduct is composed of pentaerythrithol and alkylene oxide in an amount of 5 moles or more per 1 mole of the pentaerythrithol.

27. The process for the preparation of a support as claimed in claim 25, wherein the unsaturated compound consists essentially of a tetraacrylate ester of pentaerythrithol alkylene oxide adduct.

28. The process for the preparation of a support as claimed in claim 25, wherein the irradiation with electron beam is performed at an acceleration voltage in the range of 100–1,000 kV to have the coated layer to absorb radiation in the range of 2 to 10 megarads.

* * * * *